United States Patent [19]

Roccaforte

[11] 4,111,306
[45] Sep. 5, 1978

[54] SELF-CONTAINED BAKING TRAY CARTON

[75] Inventor: Harry I. Roccaforte, Western Springs, Ill.

[73] Assignee: Champion International Corporation, Stamford, Conn.

[21] Appl. No.: 798,025

[22] Filed: May 18, 1977

[51] Int. Cl.² .......................... B65D 25/14; B65D 5/22
[52] U.S. Cl. ................................. 206/611; 229/34 R; 229/DIG. 3; 229/30
[58] Field of Search ............... 229/26, 34 R, 36, 31 R, 229/31 FS, 30; 206/611

[56] References Cited

U.S. PATENT DOCUMENTS

| 2,256,638 | 9/1941 | Blakeney | 206/611 |
|---|---|---|---|
| 2,505,034 | 4/1950 | Fettinger | 229/31 FS |
| 2,793,802 | 5/1957 | Scaturro | 229/DIG. 3 |
| 3,373,923 | 3/1968 | Martelli | 229/34 R |
| 3,520,409 | 7/1970 | Gibbs, Sr. | 229/36 X |
| 3,669,341 | 6/1972 | Hughes | 229/34 R X |
| 3,863,832 | 2/1975 | Gordon et al. | 229/30 |
| 3,886,901 | 6/1975 | Zeitter | 206/611 |

Primary Examiner—Davis T. Moorhead
Attorney, Agent, or Firm—Evelyn M. Sommer

[57] ABSTRACT

A self-contained baking tray carton is made of a one-piece carton blank of a board material having a coating or film lamination to withstand baking temperatures. The carton is adapted to initially function as a container for food contents, and may be opened via a perforated top panel to expose the contents. The container includes outwardly pivotable side panels having flaps slidably received in the end panels of the carton. After the perforated top panel is removed, the side panels may be outwardly pivoted to increase the size in volume of the container thereby enabling the container to be employed as a baking tray.

5 Claims, 5 Drawing Figures

U.S. Patent  Sept. 5, 1978  4,111,306
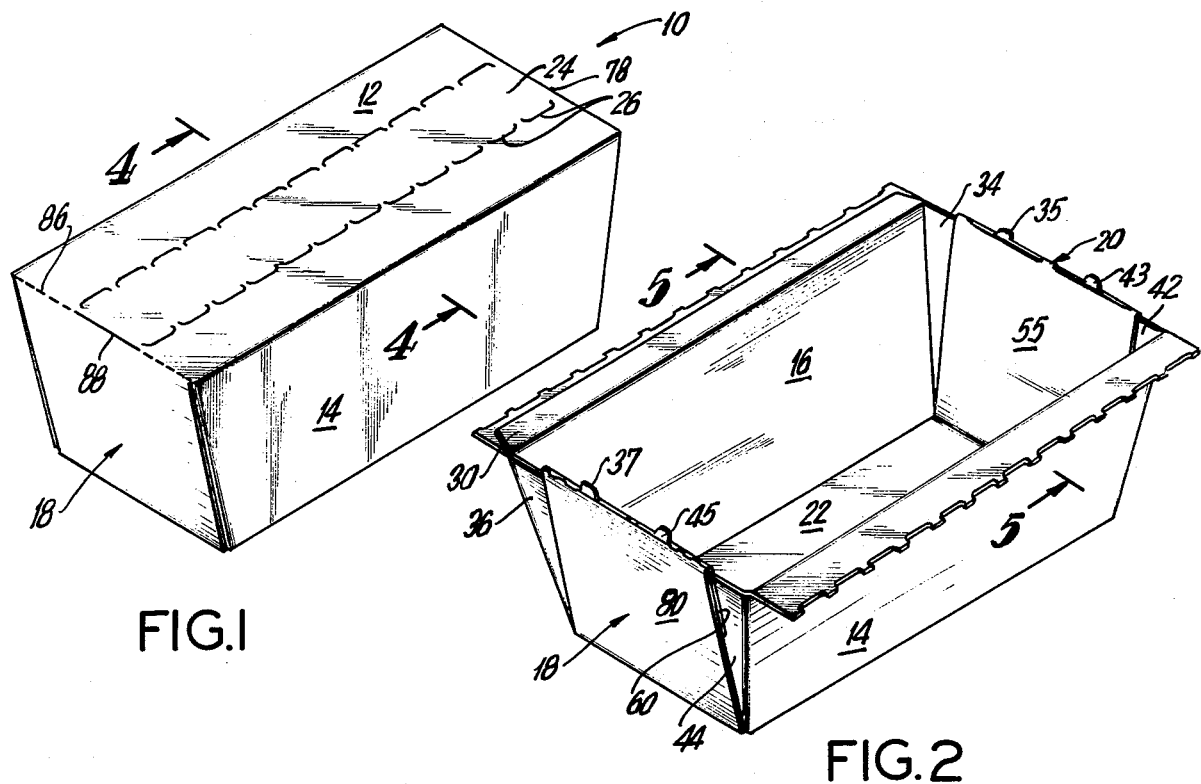

SELF-CONTAINED BAKING TRAY CARTON

The subject invention relates to a carton, and a carton blank, and more particularly a self-contained baking tray carton which may be initially employed as a closed container for enclosing foodstuffs, and subsequently employed as a baking tray for the cooking of expandable type foodstuffs, such as bread.

There are many types of foodstuffs which are presently sold on the market in containers that are adapted to be employed as a baking tray for the cooking of the food. As an example, it is known to provide a two-piece container for the packaging of the ingredients for making bread, with the container including a metallic tray which is capable of withstanding baking temperatures, and a removable top lid, usually made of a cardboard material. When the consumer wishes to remove the contents of the prior art package, he/she removes the paper cover lid and then employs the bottom base as a baking tray. These types of metallic baking trays are generally formed on a machine with a mandrel, sometimes referred to in the art as a tray-forming machine. As a general rule, most contract packers who package foodstuffs do not have tray forming machines, but primarily have seal end cartoner machines and are more able to erect one-piece cartons, rather than erect and package cartons made of two pieces, as found in prior art baking containers. As is also apparent, the cost associated with cartons made of a baking tray and a cover lid are generally more expensive than a one-piece carton, as in the subject invention, which is self-contained, in that it combines in a single structure the dual functions of being a container, as well as a baking tray.

In order to overcome the shortcomings of prior art combination container and baking tray, the subject invention provides a one-piece carton blank that may be erected to define a self-contained carton, which is made of a board material having a coating or film lamination capable of withstanding cooking temperatures. The subject carton has movable side walls, and includes a tubular container having a bottom panel, top panel, opposed side walls, and opposed end walls. The top panel includes a perforated portion that extends along the entire length of the top panel, while each of the end walls is of a multi-layer construction, with the intermediate portion of each end wall being separated to slidably receive triangular shaped locking flanges forming a portion of the side walls. Each triangular flange includes a tip that is adapted to extend through a flap in each end wall, and the locking flanges are adapted to be slidably received within the respective end walls. Extending from each opposite side of the top panel are glue flanges for maintaining the structural integrity of the carton, even after the perforated portion of the top panel is removed. Initially, the food contents such as the ingredients for making bread are placed within the carton and the carton is sealed, whereby the carton forms an enclosure for packaging the contents until such time as the consumer wishes to remove the contents of the package. He or she then removes the perforated tear strip from the top panel, thereby enabling the two side panels to be pivoted outwardly so as to increase the internal volume of the baking tray. The side portions of the top panel remaining after the perforated tear portion is removed may be folded outwardly, with the resulting baking tray being of greater volume than the initial container. Since the carton is made of a heat resistant material, the baking tray may be placed in an oven for baking of the bread and the increased volume of the baking tray thus provides the required volume for expansion of the bread dough during baking.

Additional details of the invention will be disclosed in the following description, taken in conjunction with the accompanying drawings in which:

FIG. 1 is a perspective view of the subject self-contained baking tray carton in its configuration as a package;

FIG. 2 is another perspective view of the subject carton in its configuration as a baking tray;

FIG. 3 is a plan view of the subject carton blank for forming the self-contained baking tray carton of the subject invention;

FIG. 4 is a sectional view taken along line 4—4 in FIG. 1; and

FIG. 5 is a sectional view taken along line 5—5 in FIG. 2.

Referring to FIGS. 1 and 2, the self-contained baking tray carton of the subject invention is designated by the numeral 10, and is of generally elongated tubular construction including a top panel 12, side walls 14,16, end walls 18,20, and a bottom panel 22. As shown in FIG. 3, the carton is formed of a single sheet of a carton blank, and preferably made of a material having a heat resistant coating or film lamination in order to withstand the temperature of an oven when the carton is employed as a baking tray, as more fully explained hereinafter. The top panel 12 includes a tear strip 24 defined by perforations 26.

Referring to FIG. 3, the carton blank includes, in turn, a glue tab 30, side wall 16, bottom panel 22, side wall 14, and top panel 12. The glue tab 30 is hingedly connected along fold line 32 to the side wall 16, while hingedly connected to the opposite ends of the side wall 16 along fold lines 38 and 40 are locking flanges 34 and 36, respectively. Each locking flange is of generally triangular shape and includes a locking tip, designated by the numerals 35,37. The side wall 16 is hingedly connected to the bottom panel 22 along fold line 50, while hingedly connected to the opposite ends of the bottom panel 22 along fold lines 62 and 64 are end flaps 54 and 58 respectively. Each end flap 54,58 includes a first section 55,59 and a second section 56,60, with the first and second sections being hingedly connected along fold lines 57, and 61, respectively. Side wall 14 is hingedly connected to the bottom panel 22 along fold line 52, and similar to side wall 16, includes triangular-shaped locking flanges 42,44, having locking tips 43,45, respectively, and hingedly connected along fold lines 46,48. The top panel 12 is hingedly connected to the side wall 14 along fold line 66, and includes the elongated tear strip 24 which extends along the entire length of the top panel 12 and may be removed therefrom along perforations 26. Disposed at each opposite end of the tear strip 24 are outer end flaps 70,80, while extending along the entire length of the top panel 12 along the side opposite fold line 66 is a strip of adhesive 68 which is adapted to engage the glue tab 30 in the erected condition of the carton. The outer end flap 70(80) includes parallel strips of adhesive 72,74(82,84), and is hingedly connected to the top panel 12 along fold line 76(86). A portion of the fold line 76(86) is slit as at 78(88) in order to cooperate with the perforations 26 for removal of the tear strip 24 from the upper panel. Disposed in the end flap 54 are a pair of slits 90,92 while similarly, in the end flap 58, slits 94,96 are provided. The slits in the end flaps are adapted to accomodate the locking tips 35,37,43,45 of the locking flanges, as more fully described hereinafter.

In the erection of the carton to the configuration illustrated in FIG. 1 and by solid lines in FIG. 4 wherein the carton is self-contained and functions as a package for foodstuffs, the glue tab 30 is disposed within the elongated tubular carton and is bonded to the adhesive strip 68. The end walls 18 and 20 are formed such that the first sections 55 and 59 are wholly disposed within the carton 10, and folded outwardly thereof are the second sections 56 and 60. The locking flanges 34,36,42,44 are disposed between the first and second sections respectively, with the locking tips 35,37,43,45 being respectively aligned with the slits 90 through 96. The outermost surfaces of the end walls 18,20 are formed by the outer end flaps 80 and 70, respectively. The adhesive strips 72,82 are respectively bonded to the second sections 56 and 60, respectively, while the adhesive strips 74 and 84 are adhered to the lowermost portions of the first sections 55 and 59, and do not engage the triangular shaped locking flanges 34,36,42,44. By this arrangement, the locking flanges are slidably received within the respective non-adhered portions of the end walls 18 and 20. As illustrated in FIGS. 1 and 4, the fully erected self-contained baking tray carton 10 is formed of a single carton blank thereby greatly reducing the cost of construction of the carton 10. In the configuration illustrated in FIG. 1, the baking tray carton 10 is capable of fully enclosing the contents thereof, and functions as a package for transportation, display on a shelf, and ultimate purchase by a consumer.

For employing the carton 10 as a baking tray, the consumer merely removes the tear strip 24 along the perforations 26 and the slits 78,88, and then outwardly folds the remaining portions of the top panel 12 to the dotted line positions illustrated in FIG. 4. The contents of the package are then removed, and next the consumer may enlarge the volumetric size of the carton 10 by pivoting the side walls 16,16 about their respective hinge lines 52,50 outwardly to the final position of the baking tray illustrated in FIG. 2 and FIG. 5. While the side walls 14,16 are pivoted outwardly, the locking flanges 34,36,42,44 are extended from their retracted positions within the end walls 18,20 and slide to the extended positions illustrated in FIG. 2. As the side walls 14,16 are pivoted outwardly, the locking tips 35,37,43,45 travel along arcuate paths which extend above the plane of the top panel 12, and at such time said tips extend through the slits 90-96, as illustrated in FIG. 5. As the respective locking tip contacts the end of its associated slot 90-96, the locking tip cooperates with the end of the slot for maintaining the side walls 14,16 in a fixed outwardly inclined position, as shown in FIG. 2 for baking of the foodstuffs. The enlarged size of the carton as shown in FIG. 2, as contrasted to its original volumetric size as shown in FIG. 1, enables the baking tray to accomodate the baking of foods which rise or expand during baking or cooking. After the cooking operation, the carton may be disposed of.

Accordingly there has been described a new and improved self-contained baking tray carton, as well as a one-piece carton blank for forming same, which has the desirable features of being capable of being erected by a seal end carton apparatus, and which combines in one structure both a package for the transportation of foodstuffs, as well as being capable of being transformed into a baking tray for cooking of the foodstuffs. In addition, because of the new and unique structure of the subject carton, the volumetric size of the latter may be increased to facilitate cooking, and initially be limited to a minimum size for cost savings both in transit and in occupying shelf space in a supermarket or the like.

While the invention has been described in connection with a preferred embodiment, it will be understood that it is not intended to cover all alternative modifications and equivalents as may be included within the spirit and scope of the invention as defined in the appended claims.

What is claimed is:

1. A self contained baking tray having expandable sidewalls comprising: a tubular container having a hingedly connected bottom panel, top panel, opposed sidewalls and opposed end walls, said top panel having a perforated tear out portion extending along the longitudinal axis of the container, intermediate the longitudinal edges of said top panel, said top panel further including two pairs of perforations, one perforation of each pair extending from said tear out portion to an opposite longitudinal edge of said top panel; each of said end walls being of a multilayered construction including an inner panel hingedly connected to said bottom panel, a flap member hingedly connected to the top portion of said inner panel and outwardly folded thereover to form a sliding space intermediate said inner panel and said flap member, and an outer panel hingedly connected to said top panel and overlapping its respective flap member and inner panel, said inner panel further including a pair of spaced slots along the top portion thereof; each of said end walls further including a pair of locking flanges, each locking flange being hingedly connected to one of said sidewalls, each of said locking flanges being disposed in the sliding space intermediate its respective inner panel and flap member, each of said locking flanges including a locking tip aligned with one of the spaced slots of its respective inner panel, whereby after the tear out portion of the top panel is removed, each of said side panels may be pivoted outwardly with said locking flanges sliding in their respective sliding spaces until their respective locking tips contact the end of their respective slots thereby providing an enlarged baking tray container.

2. A self-contained baking tray carton as in claim 1 wherein said carton is made from a single blank coated with a heat resistant material.

3. A self-contained baking tray carton as in claim 1 including a glue tab hingedly connected to one side wall and bonded to the top panel along the longitudinal edge thereof, said glue tab being wholly disposed in said tubular container.

4. A paperboard blank for forming a baking tray carton having outwardly pivotal sidewalls and a removable top portion comprising, in turn, along generally parallel hinge lines:

a glue flap to be disposed within the erected carton;
a first side panel, the top edge of which being hingedly connected to said glue flap, said first side panel including a first pair of locking flanges hingedly connected along opposed side edges thereof, said side edges being outwardly flared so as to taper from the top portion of said first side panel to the bottom portion thereof, each of said first locking flanges including a projecting locking tip;
a bottom panel hingedly connected to the bottom edge of said first side panel;

first and second inner panels hingedly connected to opposed side edges of said bottom panel;

first and second flap members, each being hingedly connected to a side edge of one of said inner panels, each of said inner panels including a pair of spaced apart slots along the side edge adjacent its respective flap member, said flap members being foldable against said inner panels to define a sliding space intermediate said flap members and inner panels;

a second side panel, the top edge of which being hingedly connected to the bottom edge of said bottom panel, said second side panel including a second pair of locking flanges hingedly connected along opposed side edges thereof, said side edges flaring outwardly from the top edge of said second side panel to the bottom edge thereof, each of said second locking flanges including a projecting locking tip;

each of said locking flanges being receivable in the corresponding sliding space intermediate the inner panel and flap member adjacent thereto, the locking tips of said first and second pairs of locking flanges being receivable in the slots of said inner panels;

a top panel, the top edge of which being hingedly connected to the bottom edge of said second side panel, said top panel having a perforated tear out portion intermediate its top and bottom edges; and first and second outer panels hingedly connected to the side edges of said top panel, each of said outer panels being adapted to overlap and be adhered to one of said flap members and inner panels.

5. A carton blank as in claim 4 wherein said blank is made of a heat resistant material.

* * * * *

UNITED STATES PATENT AND TRADEMARK OFFICE
CERTIFICATE OF CORRECTION

PATENT NO. : 4,111,306
DATED : September 5, 1978
INVENTOR(S) : HARRY I. ROCCAFORTE It is certified that error appears in the above-identified patent and that said Letters Patent are hereby corrected as shown below:

In Column 3, line 40, "16,16" should be -- 14,16 --.

In Column 4, line 62, delete the word "outwardly" and insert in lieu thereof -- inwardly --.

Signed and Sealed this

Twenty-ninth Day of April 1980

[SEAL]

Attest:

SIDNEY A. DIAMOND

Attesting Officer

Commissioner of Patents and Trademarks